(12) United States Patent
Hoffman

(10) Patent No.: US 10,443,400 B2
(45) Date of Patent: Oct. 15, 2019

(54) AIRFOIL FOR A TURBINE ENGINE

(71) Applicant: General Electric Company, Schenectady, NY (US)

(72) Inventor: James Michael Hoffman, Hamilton Township, OH (US)

(73) Assignee: General Electric Company, Schenectady, NY (US)

(*) Notice: Subject to any disclaimer, the term of this patent is extended or adjusted under 35 U.S.C. 154(b) by 501 days.

(21) Appl. No.: 15/238,324

(22) Filed: Aug. 16, 2016

(65) Prior Publication Data

US 2018/0051572 A1 Feb. 22, 2018

(51) Int. Cl.
*F01D 5/18* (2006.01)
*F01D 9/04* (2006.01)
*F01D 25/12* (2006.01)
*F02K 3/06* (2006.01)
*F04D 29/32* (2006.01)
*F04D 29/54* (2006.01)
*F04D 29/58* (2006.01)
*F01D 5/20* (2006.01)

(52) U.S. Cl.
CPC ............... *F01D 5/187* (2013.01); *F01D 5/20* (2013.01); *F01D 9/041* (2013.01); *F01D 25/12* (2013.01); *F02K 3/06* (2013.01); *F04D 29/324* (2013.01); *F04D 29/542* (2013.01); *F04D 29/582* (2013.01); *F01D 5/186* (2013.01); *F05D 2220/323* (2013.01); *F05D 2240/125* (2013.01); *F05D 2240/307* (2013.01); *F05D 2250/71* (2013.01); *F05D 2260/202* (2013.01); *F05D 2260/221* (2013.01); *F05D 2260/232* (2013.01); *F05D 2260/607* (2013.01); *Y02T 50/676* (2013.01)

(58) Field of Classification Search
None
See application file for complete search history.

(56) References Cited

U.S. PATENT DOCUMENTS

| 5,403,158 A | 4/1995 | Auxier |
| 7,922,451 B1 | 4/2011 | Liang |
| 7,997,865 B1 * | 8/2011 | Liang ........................ F01D 5/20 416/92 |
| 8,043,058 B1 * | 10/2011 | Liang ..................... F01D 5/187 415/173.1 |
| 8,061,987 B1 | 11/2011 | Liang |
| 8,066,485 B1 * | 11/2011 | Liang ..................... F01D 5/186 415/115 |
| 2015/0345304 A1 | 12/2015 | Mongillo et al. |
| 2016/0341046 A1 | 11/2016 | Feldmann et al. |

OTHER PUBLICATIONS

International Search Report and Written Opinion issued in connection with corresponding PCT Application No. PCT/US2017/042790 dated Jan. 30, 2018.

* cited by examiner

*Primary Examiner* — Igor Kershteyn
*Assistant Examiner* — Juan G Flores
(74) *Attorney, Agent, or Firm* — McGarry Bair PC

(57) ABSTRACT

A method and apparatus for an airfoil in a gas turbine engine can include an outer surface bounding an interior and spanning from a root to a tip. At least one flow channel can be defined among one or more full-length and partial-length ribs to further define an air flow channel within the airfoil. The air flow channel can have at least one tip turn at the partial-length rib, having at least one hole, for example a film hole, in a portion of the tip.

25 Claims, 5 Drawing Sheets

AIRFOIL FOR A TURBINE ENGINE

BACKGROUND OF THE INVENTION

Turbine engines, and particularly gas or combustion turbine engines, are rotary engines that extract energy from a flow of combusted gases passing through the engine onto a multitude of rotating turbine blades.

Gas turbine engines for aircraft are designed to operate at high temperatures to maximize engine efficiency, so cooling of certain engine components, such as the high pressure turbine and the low pressure turbine, can be beneficial. Typically, cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is a high temperature, it is cooler relative to the turbine air, and can be used to cool the turbine.

Contemporary turbine blades generally include one or more interior air flow channels for routing the cooling air through the blade to cool different portions of the blade, and can include dedicated air flow channels for cooling different portions of the blade. The air flow channels can include one or more airflow element to enhance the cooling, however, such elements can lead to excessive collection of dust or particular matter reducing service life or requiring additional maintenance.

BRIEF DESCRIPTION OF THE INVENTION

In one aspect, embodiments of the invention relate to an airfoil for a turbine engine comprising a wall bounding an interior and defining a pressure sidewall and a suction sidewall, extending chord-wise from a leading edge to a trailing edge and span-wise from a root to a tip defining a tip surface, an air flow channel located within the interior and having a portion located adjacent the tip, and at least one hole extending through the tip and having an inlet fluidly coupled to the air flow channel, an outlet located in the tip surface, and a passage fluidly coupling the inlet to the outlet, and the passage adjacent the outlet has a centerline approaching the tip surface at an angle less than 60 degrees.

In another aspect, embodiments of the invention relate to an airfoil for a turbine engine comprising a wall bounding an interior and defining a pressure sidewall and a suction sidewall, extending chord-wise from a leading edge to a trailing edge and span-wise from a root to a tip having a tip floor and a tip rail extending span-wise beyond the tip rail, with the tip floor and tip rail defining a tip surface, an air flow channel located within the interior and having a tip turn located adjacent the tip floor, and at least one hole extending through at least one of the tip floor or the tip rail and having an inlet fluidly coupled to the air flow channel, a diffusing outlet located in the tip surface downstream of the inlet, and a passage fluidly coupling the inlet to the outlet, and the passage adjacent the outlet has a centerline approaching the tip surface at an angle less than 60 degrees.

In yet another aspect, embodiments of the invention relate to a method of cooling a tip of an airfoil comprising supplying cooling air from an interior of the airfoil to a surface of the tip through a curvilinear passage and emitting the cooling air in a diffusing pattern at an angle generally tangential to the surface.

DESCRIPTION OF EMBODIMENTS OF THE INVENTION

Figure 1:
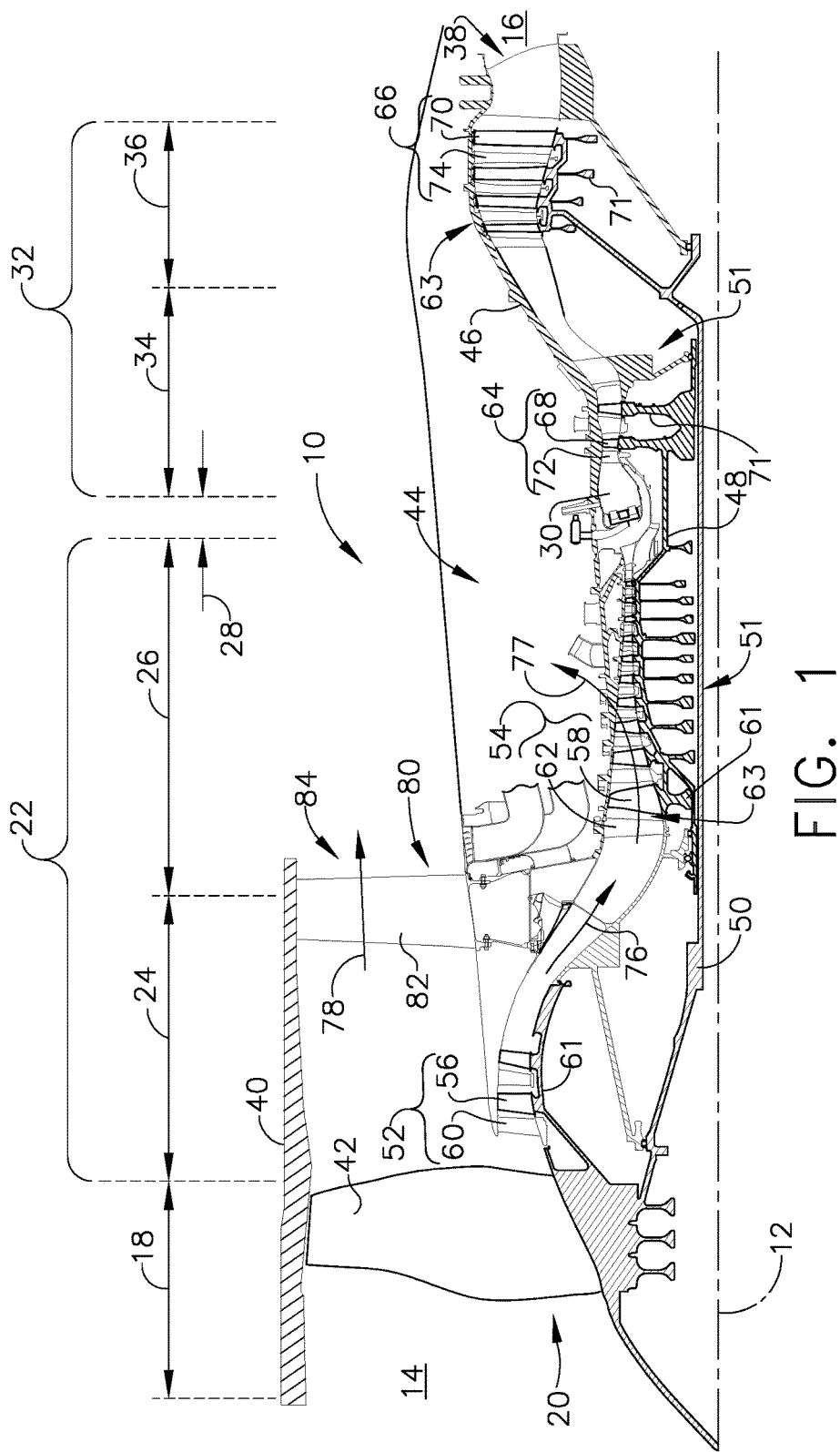
FIG. 1 is a schematic cross-sectional diagram of a gas turbine engine for an aircraft.

The described embodiments of the present invention are directed to a hole, for example a film hole, extending through a tip of an airfoil in a passage. For purposes of illustration, the present invention will be described with respect to the turbine for an aircraft gas turbine engine. It will be understood, however, that the invention is not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be draw from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
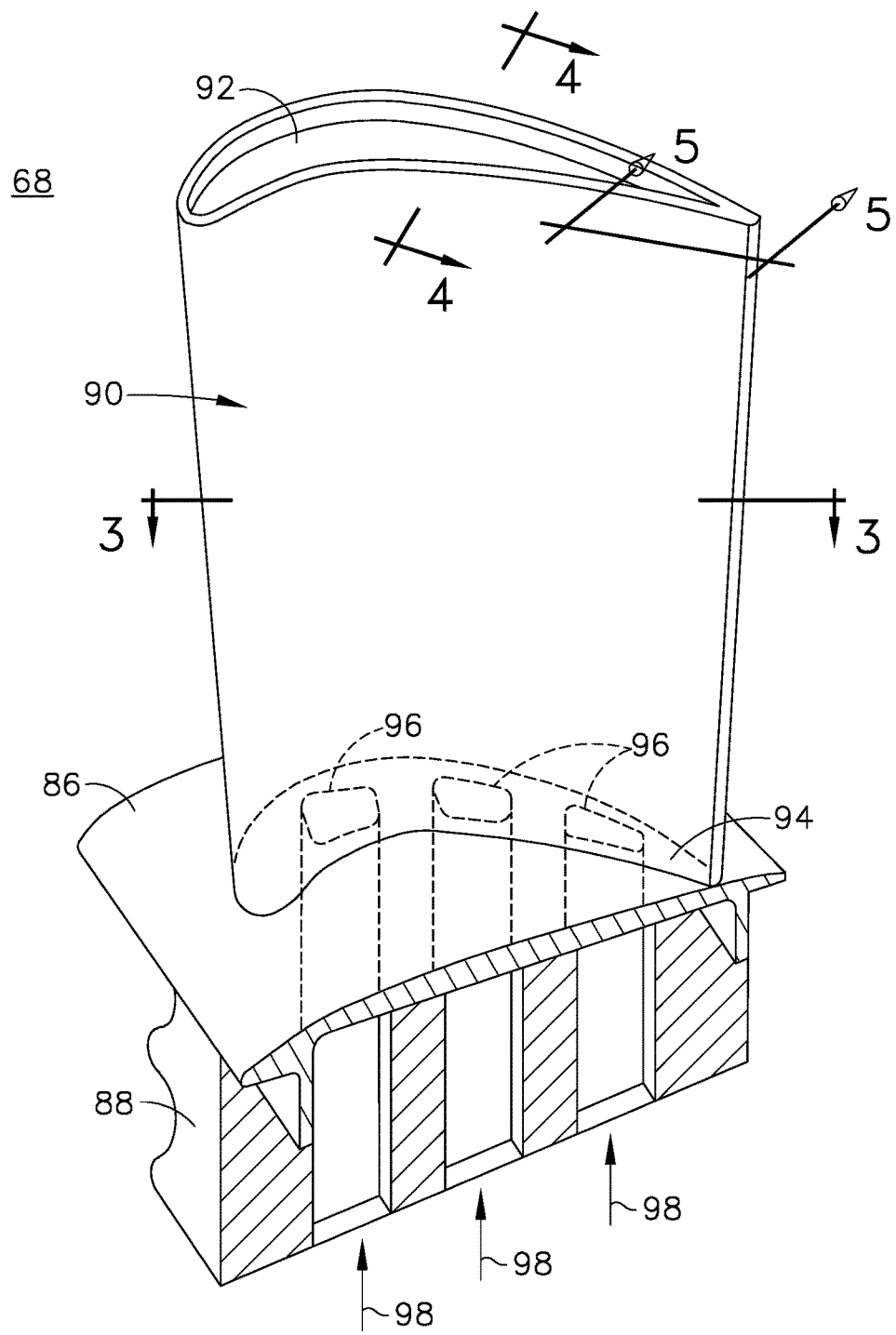
FIG. 2 is an isometric view of an airfoil of the gas turbine engine of FIG. 1.

FIG. 2 is a perspective view of an engine component in the form of one of the turbine blades 68 of the engine 10 from FIG. 1. The turbine blade 68 includes a dovetail 88 and an airfoil 90. The airfoil 90 extends from a tip 92 to a root 94 defining a span-wise direction. The dovetail 88 further includes a platform 86 integral with the airfoil 90 at the root 94, which helps to radially contain the turbine airflow. The dovetail 88 can be configured to mount to a turbine rotor disk 71 on the engine 10. The dovetail 88 comprises at least one inlet passage 96, exemplarily shown as three inlet passages 96, each extending through the dovetail 88 to provide internal fluid communication with the airfoil 90 at a passage outlet 98. It should be appreciated that the dovetail 88 is shown in cross-section, such that the inlet passages 96 are housed within the body of the dovetail 88.

Figure 3:
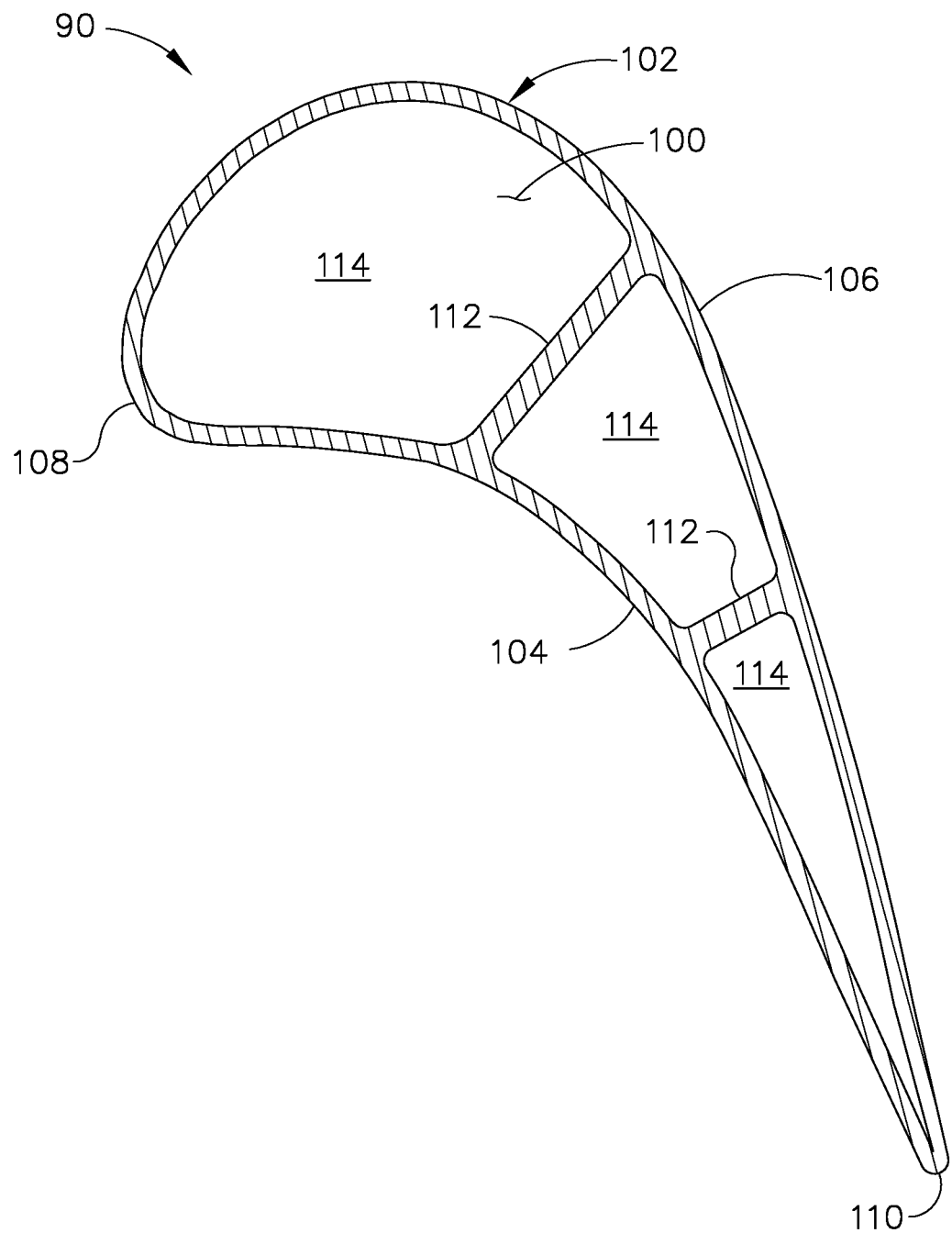
FIG. 3 is a cross-sectional view of the airfoil of FIG. 2.

Turning to FIG. 3, the airfoil 90, shown in cross-section, has an interior 100 bounded by an outer wall 102 defined as a concave-shaped pressure sidewall 104 and a convex-shaped suction sidewall 106 which are joined together to define the airfoil shape with a leading edge 108 and a trailing edge 110, defining a chord-wise direction therebetween. The blade 68 rotates in a direction such that the pressure sidewall 104 follows the suction sidewall 106. Thus, as shown in FIG. 3, the airfoil 90 would rotate upward toward the top of the page.

The airfoil 90 further includes a plurality of ribs 112 disposed within the interior 100, which can extend between the pressure and suction sidewalls 104, 106. Alternatively, the ribs 112 can extend partially between the pressure and suction sidewalls 104, 106, or in any other direction or manner within the interior 100. The ribs 112 define a plurality of channels 114 extending in the span-wise direction at least partially between the tip 92 and the root 94.

Figure 4:
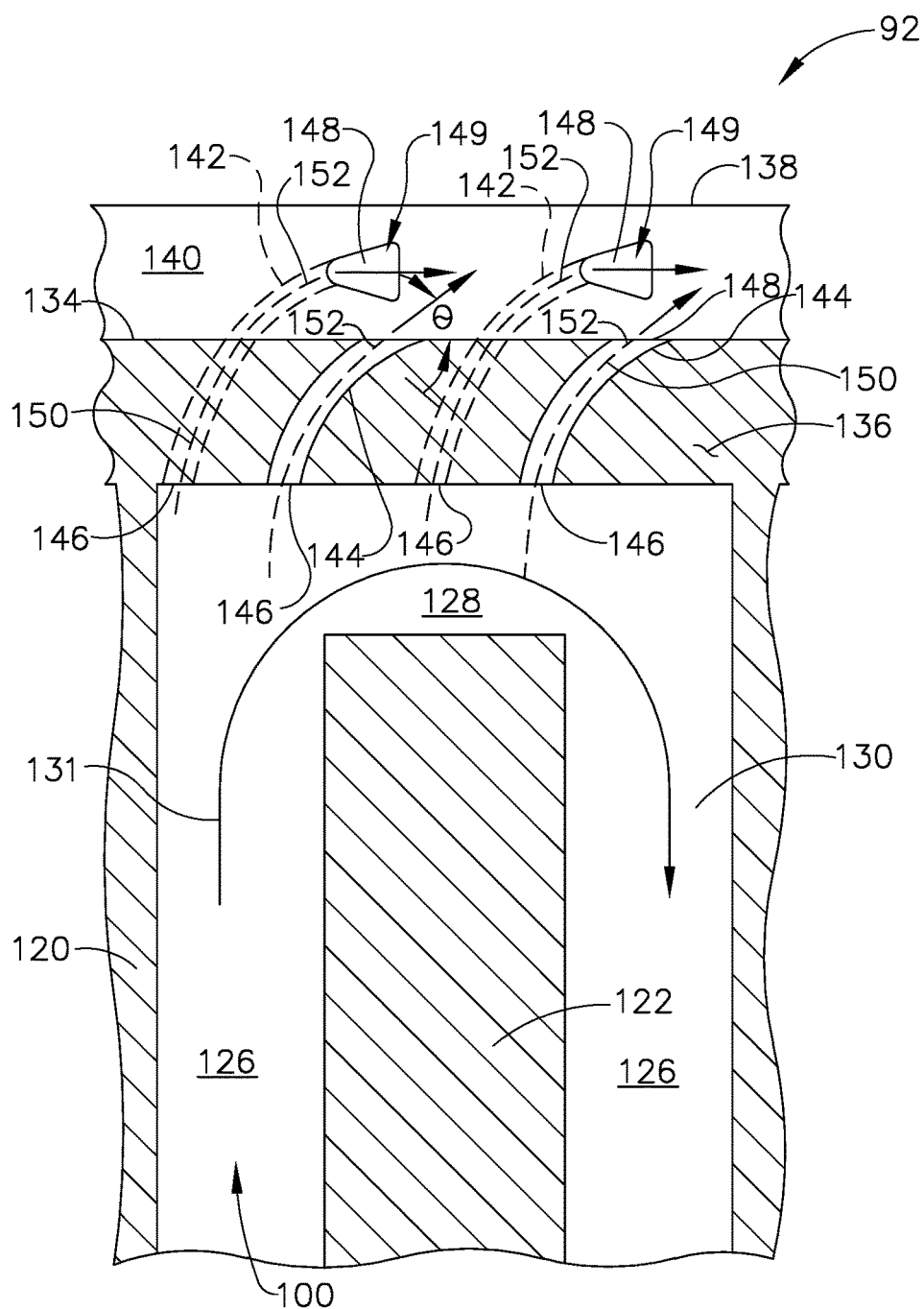
FIG. 4 is a cross-section view of the airfoil of FIG. 2 illustrating a tip turn having a passage from an inlet to an outlet on a tip surface.

Referring to FIG. 4, a cross-section view of the airfoil 90 illustrates three ribs 112, with two full-length ribs 120 having one partial-length rib 122 disposed therebetween. The full-length ribs 120 extend fully in the span-wise direction between the root 94 and the tip 92. The partial length rib 122 extends only partially in the span-wise direction, having a terminal end 124 being spaced from the tip 92. It should be appreciated that, alternatively, the full-length ribs 120 do not need to extend fully to the root 94, but can extend from the tip 92 partially in the span-wise direction, terminating prior to the root 94.

A flow channel 126 can be defined between each rib 112, having one flow channel 126 disposed between the partial length rib 122 and each full-length rib 120. The flow channels 126 can be in fluid communication via a tip turn 128 disposed in the space between the partial-length rib 122 and the tip 92. The combined flow channels 126 and tip turn 128 can define an air flow channel 130 extending through the airfoil 90 in a serpentine manner. The tip turn 128 can be defined as the span-wise area radially outward of the partial-length rib 122 illustrated as a turn axis 131. It is understood that the ribs 120 can be disposed in a multitude of different orientations, defining multiple air flow channels within the airfoil 90.

The tip 92 can include a cool surface 132 facing and adjacent to the air flow channel 130 and a tip floor 134 together defining a tip substrate 136 therebetween. The tip 92 can further include at least one tip rail 138 extending radially from the tip floor 134. The tip substrate 136 can be formed with a plate and the at least one tip rail 138 can be formed as an extension of one of the pressure or suction sidewalls 104, 106 or both can be formed as one piece using additive manufacturing along with any other components of the blade 68, including the pressure and suction sidewalls 104, 106. It should be understood that the parts described herein can be made by any known method or combination of methods including but not limited to, casting, machining, additive manufacturing, coating, or otherwise.

The tip floor 134 and at least one tip rail 138 together define a tip surface 140. At least one hole, comprising a plurality of holes illustrated as first and second holes 142, 144 can have an inlet 146 located at the cool surface 132 and an outlet 148 located in the tip surface 140, wherein the outlet 148 is downstream the inlet 146. The outlet 148 can be located in the tip surface 140 on the at least one tip rail 138 or in the tip surface 140 on the tip floor 134. It should be understood that the geometry of the first and second holes 142, 144 can have varying configurations known in the art wherein a fluid, such as a cooling fluid, is passed through a hole, for example a film hole, and emerges from an outlet, for example a diffusing outlet 149 as illustrated on the tip rail 138.

The hole can be formed using cast in hole technology or additive manufacturing where the hole is formed and curved when the outer wall 102, tip substrate 136, and tip rail 138 are formed. This technology permits an outlet 148 on surfaces, for example the tip rail 138. Improvements in core dies enables casting of holes of this size and geometry previously difficult to achieve with line of sight requirements for drilling holes. Additive manufacturing is also a possible forming technique when the additive manufacturing enables smooth transitioning in layers and single crystal metal forming.

The first and second holes 142, 144 both have a curvilinear passage comprising a passage 150 fluidly coupling the inlet 146 to the outlet 148. The passages 150 of the first and second holes 142, 144 extend through the tip rail 138 and tip floor 134 respectively. The outlet 148 is offset from the inlet 146 such that a centerline 152 must curve from the inlet 146 toward the trailing edge 110 before exiting at the outlet 148. Adjacent the outlet(s) 148 the centerline 152 approaches the tip surface 140 at an angle θ greater than 10 degrees and less than 60 degrees defining an angle generally tangential to the tip surface 140.

Figure 5:
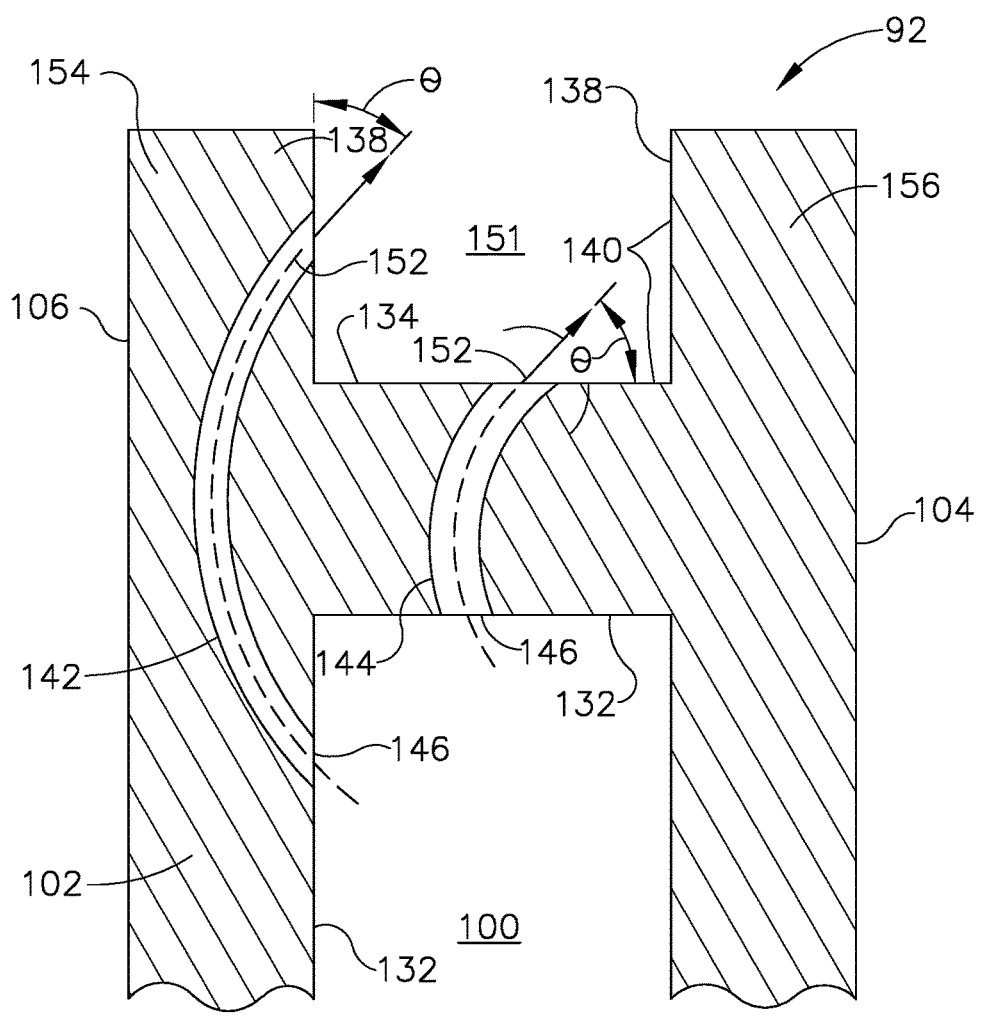
FIG. 5 is a cross-sectional view of the airfoil of FIG. 2 orthogonal to the cross-section of FIG. 4 illustrating a tip turn having a passage from an inlet to an outlet on a tip surface.

Turning to FIG. 5 a cross-sectional view of the airfoil 90 orthogonal to the cross-section of FIG. 4 at the tip 92 is illustrated. The at least one tip rail 138 comprises first and second tip rails 154, 156 on opposite sides of the tip floor 134 together defining a cavity 151. The outlet 148 can be located in either one of the first and second tip rails 154, 156. The inlet 146 can be located on the cool surface 132 along the outer wall 102 wherein the passage 150 of the first hole 142 extends from the interior 100 through the outer wall 102 exiting at the outlet 148 located in the tip rail 154. Cooling air C is supplied to one of the first and second holes 142, 144 along the passage 150 where it can exit at the angle θ, as described herein and defining an angle generally tangential to the surface. While depicted as curving first towards the suction side 106 and then away from the suction side 106, it should be understood, that the amount of curvature or the direction of curvature defining the curvilinear passage 150 can vary and is not meant to be limiting.

Considering FIG. 4 and FIG. 5 together, the curvilinear passage defining the passage 150 can have a range of curvature in a circumferential, axial, or radial direction or in any combination of circumferential, axial, and radial directions. The range of curvature yields angles θ that are less than 60° at which cooling air C exits the outlet(s) 148 to form a cooling film.

A method of cooling the tip 92 of the airfoil 90 comprises supplying the cooling air C from the interior 100 of the airfoil 90 to the tip surface 140 of the tip 92. The cooling air C will pass through the passage 150 of at least one of the first and second holes 142, 144, and be emitted in a diffusing pattern at the angle θ generally tangential to the tip surface 140. The method further includes supplying the cooling air C from the air flow channel 126 located within the airfoil 90 and emitting the cooling air C from the air flow channel 126 comprises emitting air at the tip turn 128 of the air flow channel 126.

The method can include providing the cooling air to a low flowing region comprising the tip turn 128 or tip cavity 151 for dust abatement or to prevent dust accumulation.

It should be appreciated that the curvilinear passage 150 as described herein would permit some amount of cooling film to be formed on the tip floor 134. The tip 92 is a very turbulent region within the airfoil 90, thus adding holes 142, 144 with inlets formed such that they mirror the turbulent flow path of the cooling air C within air flow channel 130 increases the efficiency with which the cooling air C is supplied to at least one of the holes 142, 144. Additionally this adds a vector to the current art, in that cooling air C is supplied as a cooling film on the tip surface in a combination of directions, being one of circumferentially, axially, or radially, rather than a single direction, or vector. Finally, the curved hole technology as described herein allows for emitting cooling air C at the tip floor 134 at considerably smaller angles when compared to emission angles known in the art. It should be further appreciated that the cooling air can improve an internal heat transfer coefficient, a measure of convective heat transfer rate of components of the airfoil.

It should be appreciated that application of the disclosed design is not limited to turbine engines with fan and booster sections, but is applicable to turbojets and turbo engines as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a turbine engine comprising:
a wall bounding an interior and defining a pressure sidewall and a suction sidewall, extending chord-wise from a leading edge to a trailing edge and span-wise from a root to a tip defining a tip surface;
an air flow channel located within the interior and having a portion located adjacent the tip; and
at least one hole extending through the tip and having an inlet fluidly coupled to the air flow channel, an outlet offset from the inlet in a direction toward the trailing edge and located in the tip surface, and a continuous curvilinear passage fluidly coupling the inlet to the outlet, and the passage adjacent the outlet has a centerline approaching the tip surface at an angle less than 60 degrees.

2. The airfoil of claim 1 wherein the angle is greater than 10 degrees.

3. The airfoil of claim 1 wherein the portion of the air flow channel is a tip turn.

4. The airfoil of claim 1 wherein the outlet is downstream of the inlet.

5. The airfoil of claim 1 wherein the at least one hole comprises a plurality of holes.

6. The airfoil of claim 1 wherein the tip comprises a tip floor defining at least a portion of the tip surface.

7. The airfoil of claim 6 wherein the outlet is located in the tip floor.

8. The airfoil of claim 7 wherein the curvilinear passage extends through the tip floor.

9. The airfoil of claim 6 wherein the tip further comprises at least one tip rail extending above the tip floor and defining at least a portion of the tip surface.

10. The airfoil of claim 9 wherein the outlet is located in the at least one tip rail.

11. The airfoil of claim 10 wherein the passage extends through the tip rail.

12. The airfoil of claim 9 wherein the at least one tip rail comprises first and second tip rails on opposite sides of the tip floor.

13. The airfoil of claim 12 wherein the outlet is located in one of the first and second tip rails.

14. The airfoil of claim 9 wherein the tip rail comprises an extension of the wall and the passage extends through the wall and the tip rail.

15. The airfoil of claim 1 wherein the outlet is a diffusing outlet.

16. An airfoil for a turbine engine comprising:
a wall bounding an interior and defining a pressure sidewall and a suction sidewall, extending chord-wise from a leading edge to a trailing edge and span-wise from a root to a tip having a tip floor and a tip rail extending span-wise beyond the tip floor, with the tip floor and tip rail defining a tip surface;
an air flow channel located within the interior and having a tip turn located adjacent the tip floor; and
at least one hole extending through at least one of the tip floor or the tip rail and having an inlet fluidly coupled to the air flow channel, a diffusing outlet offset from the inlet in a direction toward the trailing edge and located in the tip surface downstream of the inlet, and a continuous curvilinear passage fluidly coupling the inlet to the outlet, and the passage adjacent the outlet has a centerline approaching the tip surface at an angle less than 60 degrees.

17. The airfoil of claim 16 wherein the at least one hole comprises a plurality of holes.

18. The airfoil of claim 17 wherein the passage extends through the tip floor.

19. The airfoil of claim 17 wherein the passage extends through the tip rail.

20. A method of cooling a tip of an airfoil comprising:
supplying cooling air from an interior of the airfoil to a surface of the tip through a continuous curvilinear passage extending between an inlet at the interior and a diffusing outlet at the surface of the tip and offset from the inlet in a direction toward a trailing edge of the airfoil; and
emitting the cooling air in a diffusing pattern at an angle generally tangential to the surface.

21. The method of claim 20 wherein the angle is less than 60 degrees relative to the surface.

22. The method of claim 21 wherein the curvilinear passage passes through at least one of a tip floor and tip rail forming the surface.

23. The method of claim 22 wherein supplying cooling air comprises supplying cooling air from a channel located within the airfoil.

24. The method of claim 23 wherein emitting air from the channel comprises emitting air at a tip turn of the channel.

25. The method of claim 20 wherein the supplying cooling air comprises venting a low flow region of the tip to abate dust accumulation.

* * * * *